Nov. 9, 1937.  E. W. GENT  2,098,287
SYSTEM OF INDICATING DISTANCE
Filed Dec. 21, 1935
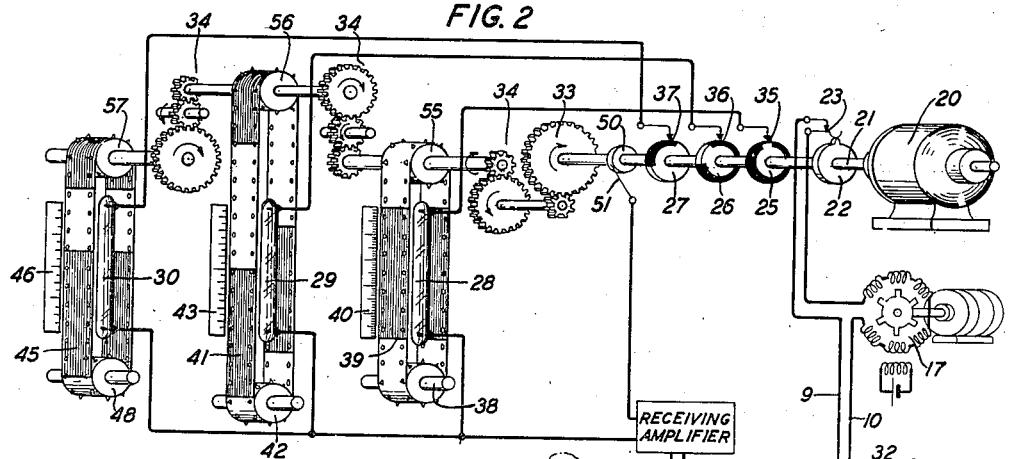
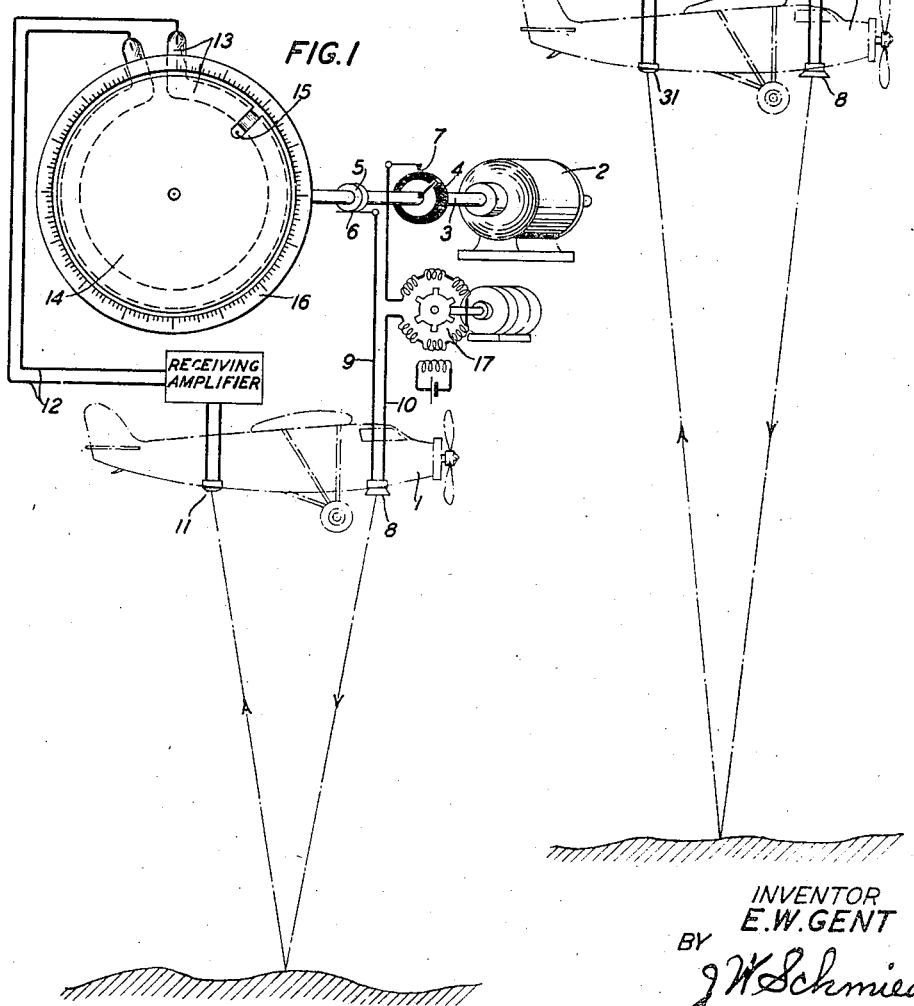
INVENTOR
E. W. GENT
BY
J. W. Schmied
ATTORNEY Patented Nov. 9, 1937

2,098,287

UNITED STATES PATENT OFFICE 2,098,287

SYSTEM OF INDICATING DISTANCE

Edgar W. Gent, Morristown, N. J., assignor to Bell Telephone Laboratories, Incorporated, New York, N. Y., a corporation of New York Application December 21, 1935, Serial No. 55,589

5 Claims. (Cl. 177—352)

This invention relates to a system of indicating distance and more particularly to a system for measuring the altitude of an airplane above the terrain.

An object of this invention is to ascertain distance.

A more particular object of this invention is to obtain on an aircraft a quick and accurate determination of the altitude of the aircraft.

Systems have heretofore been proposed for ascertaining the altitude of an airplane above the terrain. Some of these systems require frequent adjustment of the apparatus resulting in constant attention of the airplane pilot, while with other systems the indication of the altitude is difficult to discern. These systems are particularly disadvantageous when an airplane approaches an airport to land. The plane within a few seconds frequently descends from several hundred feet to a few feet above the airport runway. During this period the pilot is especially occupied and a clear, quick and accurate indication of the altitude of the airplane without any adjustment of apparatus is highly desirable for the proper landing of the plane.

In accordance with this invention, an indication of the altitude of an aircraft is obtained by observation of a plurality of illuminating devices. Each of these devices indicates a particular range of distances. When the altitude of the airplane above ground is within one of these ranges, the device corresponding to that particular range becomes illuminated. The altitude of the plane within the range is ascertained by observing the portion of the device which is exposed to view.

In a specific embodiment, a sound wave is transmitted at predetermined intervals. After reflection on the ground, the wave actuates the discharge of one of a plurality of neon tubes corresponding to the range of altitude within which the airplane is located at the time. A shutter having opaque and transparent portions constantly rotates in front of each of the tubes or in front of a slit illuminated by the tubes. The shutter is adjusted so that when at the distance of one limit of the particular range of distances corresponding to the tube, the opaque portion of the shutter completely covers the tube or slit, while at the other limit the tube or slit is completely exposed by the transparent portion of the shutter. The rotation is such that the opaque portion is gradually removed from one limit to the other and the portion of opaque covering of the tube or slit is dependent upon the distance or the altitude within the particular range of the tube. Accordingly, when the sound wave actuates the discharge of a neon tube corresponding to a particular range, the height of the airplane is indicated by observing the proportion of illumination of the tube or slit which is visible. A suitably calibrated scale is associated with each tube to aid in this observation.

A more comprehensive understanding of this invention is obtained by reference to the accompanying drawing, in which:

Fig. 1 is a schematic diagram of an embodiment of this invention; and

Fig. 2 is a schematic diagram of another embodiment of this invention.

Fig. 1 shows a sonic altimeter in accordance with this invention employed on an airplane 1. A constantly rotating motor 2 rotates a shaft 3. Fixedly attached to the shaft 3 are a contact wheel 4 and a conducting wheel 5. The conducting wheel 5 is continuously in contact with a brush 6 connected to one lead 9 of a transmitter 8. The transmitter 8 is preferably of the directional type and is located on the under side of the airplane 1. Another lead 10 of the transmitter 8 is connected to one terminal of an inductor-alternator 17. The inductor-alternator 17 is of the type described in an article entitled "Inductor Alternators for Signalling Purposes" by F. W. Merrill, published in Electrical Engineering, January 1934, vol. 53, No. 1, pages 78 to 94. The inductor-alternator is preferably capable of generating a frequency of from two thousand to nine thousand cycles per second. The other terminal of the inductor-alternator is connected to a contact 7 in engageable relation with the periphery of the contact wheel 4. The periphery of the contact wheel 4 is constructed of insulated and conducting portions so that for a brief interval during each revolution of the shaft 3 the conducting portion of the contact wheel 4 engages the contact 7 to provide a series connection through the shaft 3, conducting wheel 5 and contact 6 between the inductor-alternator 17 and the transmitter 8. When the inductor-alternator 17 is connected to the transmitter 8 by the engagement of the conducting portion of the contact wheel 4 with the contact 7, a wave or train of waves is transmitted by the transmitter 8. When these waves pass through the air to the terrain, they are reflected therefrom. The reflected waves are impressed upon a microphone 11 connected to a receiving amplifier indicated by a block diagram in the drawing. The receiving amplifier is preferably tuned to the frequency of the waves transmitted by the transmitter 8. The reflected waves, after amplification by the receiving amplifier pass through a pair of leads 12 to the terminals of a toroidal illuminating device 13. While the device 13 may be any type of illuminating device, it is preferably of the type which is filled with neon gas and known commercially as a neon lamp or tube. A circular shutter 14 fixedly attached to the shaft 3 and having a slit 15 therein serves to completely cover the tube 13 from view with the exception of the small portion observed through the slit 15. A scale 16 is located immediately adjacent to the circumference of the disc shutter 14 and serves to assist in determining the particular location of the slit 15 when the tube 13 flashes.

The shaft 3 is rotated at a uniform speed by the motor 2. The motor associated with the inductor-alternator 17 is continually operated. During the brief interval in which the conducting portion of the periphery of the contact wheel 4 engages the contact 7 to connect the inductor-alternator 17 to the transmitter 8, a wave or train of waves is transmitted by the transmitter 8. The wave or train of waves, after passage through the air or other molecular medium and reflection upon the terrain, is impressed upon the microphone 11. The received wave or train of waves is amplified by the receiving amplifier and the current in the output of the amplifier illuminates the neon device or tube 13. A portion of the illuminated tube is exposed to view by the slit 15 in the circular shutter 14. Since the position of the slit 15 depends upon the rotation of the shutter 14 or the time elapsing between the transmission of the waves and their reception by the microphone to illuminate the tube 13, the position of the slit indicates the distance of the airplane above the terrain. The circular scale 16 aids in this determination. The slit 15 can be so located on the circular shutter 14 that it is immediately adjacent to the zero reading on the scale when the contact 7 engages the conducting portion of the contact wheel 4 to transmit a wave or train of waves. The circular distance traversed by the slit around the scale is correlated directly with the distance of the airplane above the terrain. The speed of the motor 2 is adjusted so that the shaft 3 revolves one complete revolution during the time required for a wave to travel from the airplane to the terrain and return to the plane after reflection for the maximum altitude to be ascertained.

Fig. 2 shows a distance determining system in which a plurality of illuminating devices are employed, each device capable of indicating a different range of distances. A shaft 21 is rotated at a uniform speed by a motor 20. A contact wheel 22 with an elevation on its periphery controls a pair of contacts 23 in engageable relation with the periphery of the contact wheel 22. During a brief interval of the rotation of the contact wheel 22, the elevation on the periphery thereof results in the engagement of the contacts 23. At all other times of a complete revolution of the wheel 22, the contacts 23 are disengaged. One of the contacts 23 is connected to lead 9 of a transmitter 8, while the other contact 23 is connected to one terminal of an inductor-alternator 17. The other terminal of the inductor-alternator 17 is connected by means of a lead 10 to the transmitter 8. Both the transmitter 8 and the inductor-alternator 17 shown in Fig. 2 are identical with the same apparatus in Fig. 1. During the normal operation of the system shown in Fig. 2, the motor associated with the inductor-alternator is continuously rotating. When the contacts 23 engage during a brief interval of each rotation of the shaft 21, the inductor-alternator 17 is connected to the transmitter 8 to transmit a wave or train of waves.

Three sectional slip rings 25, 26 and 27 are fixedly attached to the rotatable shaft 21. Each of the rings 25, 26 and 27 has an insulated and a conducting portion on its periphery. The conducting portion of each of the rings 25, 26 and 27 is connected electrically to one lead of a receiving amplifier indicated by the block diagram in the drawing. The connection to this lead of the receiving amplifier is accomplished through a collector ring 50 fixedly attached to the shaft 21 and a brush 51 connected to the lead and constantly engageable with the ring 50. Contacts 35, 36, and 37 are in engageable relation with the peripheries of the rings 25, 26, and 27, respectively. Three neon illuminating devices 28, 29 and 30 are connected, respectively, to the contacts 35, 36 and 37. The other terminals of the devices 28, 29 and 30 are connected to the other lead of the receiving amplifier. The engagement of the conducting portion of the peripheries of the rings 25, 26 and 27 with their respective contacts 35, 36 and 37 results in a connection through the rotatable shaft 21 from the receiving amplifier to the terminal of the lamp with which the particular engaged contact and contact wheel are associated. A microphone 31 is connected to the input of the receiving amplifier. Both the microphone 31 and the transmitter 8 are located on the under side of an airplane 32.

When a wave or train of waves after reflection on a surface is impressed upon the microphone 31, one of the devices 28, 29 or 30 is illuminated depending upon which of the contacts 35, 36 or 37 engages the conducting portion of its respectively associated contact wheel. The conducting portions of the rings 25, 26 and 27 are such and the rings 25, 26 and 27 are fixedly attached to the shaft 21 so that the device 28 becomes illuminated if the airplane 32 is within the lowest range desired to be estimated. Device 30 is illuminated if the airplane is within the highest range desired to be ascertained and device 29 if the plane is with a range intermediate between the lowest and highest range. If, for example, device 28 is illuminated when the airplane is 1 to 50 feet above the terrain, lamp 29 when the plane is 50 to 150 feet above the terrain and tube 30 when the plane is 150 to 550 feet above the surface, the conducting portion of the ring 25 is one-twelfth of the circumference of the ring 25, ring 26 two-twelfths, and ring 27 eight-twelfths. This proportion of the circumference includes a small overlap of the distances between the various ranges. The ring 25 is fixedly attached to the shaft 21 so that the contact 35 engages with the conducting portion of the ring 25 a short interval after the contact 23 becomes engaged. This interval corresponds to the period required for a wave to travel 2 feet or slightly more than the distance between the transmitter 24 and the microphone 31 if no baffle between the microphone and transmitter is employed. Accordingly, the device 28 is not illuminated as a result of the direct transmission of waves from the transmitter to the microphone. The ring 26 is fixedly attached to the shaft 21 so that the contact 36 engages the conducting portion of the ring 26 immediately prior to the time at which the contact 35 disengages from the ring 25. Likewise, the contact 37 engages with the conducting portion of the ring 27 immediately prior to the disengagement of the contact 36 with the conducting portion of the periphery of the ring 26. The speed of the motor 20 is adjusted so that the shaft 21 revolves one complete revolution in a period of time corresponding to the highest limit of the maximum range of altitude to be estimated.

Fixedly attached to the shaft 21 is a gear 33. A plurality of gears 34 are in engageable relation with the gear 33 to rotate a drive sprocket 55 at approximately 11 revolutions per second, a drive sprocket 56 at approximately 5.6 revolutions per second, and a drive sprocket 57 at approximately 1 revolution per second if the maximum distance to be indicated by devices 28, 29 and 30 are approximately 50, 150 and 550 feet, respectively, and the molecular medium through which the waves pass is air. The rate of rotation of the sprockets 55, 56 and 57 depends upon the range of distances to be indicated. The time required for rotation of each of the sprockets is that for a wave to travel from the system to a reflecting surface and return to the system in the maximum distance to be indicated by the illuminating devices with which each of the sprockets is respectively associated. The drive sprockets 55, 56 and 57 are capable of rotating 16 millimeter motion picture film. A circular band film 39 having opaque and transparent portions is driven by the drive sprocket 55 and rotated with the aid of another sprocket 38 in front of the tube 28. The opaque and transparent portions of the band of film are situated so that the opaque portion completely covers the tube at the beginning of the range. During the interval of time corresponding to the range of the tube 28, the tube 28 is gradually exposed to view to an observer located in front of the film by the gradual movement of the transparent portion of the film in front of the tube 28. At the end of the time interval corresponding to the highest limit of the range of distances which the tube 28 indicates, the entire length of the tube 28 is observed through the transparent portion of the film. In this manner, the approximate location of the airplane within the range indicated by the tube 28 is observed. A scale 40 located immediately adjacent to the band film 39 aids in this determination. In a like manner, a band film 41 is associated with the tube 29 and is rotated by the drive sprocket 56 with the aid of another sprocket 42. The transparent portion of the film indicates the distance that the airplane 32 is located within the range indicated by the tube 29. A scale 43 located immediately adjacent to the film 41 assists in this determination of the distance within the range. A transparent and opaque band film 45 rotated by the drive sprocket 57 around another sprocket 48 indicates the distance within the range indicated by the tube 30. A scale 46 similar to the scale 40 located immediately adjacent to the film 45 shows the distance within the range. The scales 40, 43 and 46 are preferably calibrated empirically to indicate the distance within their respective ranges.

When the contacts 23 engage at predetermined intervals, a wave or train of waves is transmitted by the transmitter 8. After reflection on the terrain, the reflected waves are impressed upon the microphone 31. The impressed waves produce currents in the output of the receiving amplifier to illuminate one of the plurality of neon tubes 28, 29 or 30, depending upon the particular range of distances within which the airplane is located. The distance within any one of the particular ranges is indicated by the proportion of the illuminated neon tubes exposed to view to an observer by its respectively associated rotating band shutter and scale.

The three devices or tubes 28, 29 and 30 may be nested close together behind a plate bearing the calibrated values of the range of distances corresponding to each tube and the whole unit of three tubes, plates and shutters may be mounted upon the instrument panel of an airplane. To further aid in identifying the particular range of distances, each tube may be different in color. For example, tube 28 may be red, tube 29 blue and tube 30 green. Instead of the inductor-alternator 17, any other source of sonic or supersonic waves may be employed.

Although the distance determining systems are described for use in airplanes, these systems are equally applicable to ships for depth determination at sea. While preferred embodiments of this invention have been illustrated and described, various modifications therein may be made without departing from the scope of the appended claims.

What is claimed is:

1. A sonic altimeter for airplanes comprising means for transmitting a longitudinal wave at predetermined intervals, a plurality of gaseous space discharge devices corresponding to different ranges of distances to be indicated, means responsive to said waves after passing through a molecular medium for selectively discharging one of said devices to indicate the particular range of distances traveled by said longitudinal wave, and means associated with each of said devices for indicating the distance within said range through which said longitudinal wave has traveled.

2. In an altimeter for an airplane, a plurality of gaseous space discharge devices, a movable shutter located adjacent each of said devices, each shutter having an opaque section and a transparent section, control means for transmitting a signal from said airplane to earth, for partially completing circuits to light said devices consecutively, and for moving each of said shutters with respect to the associated devices, said shutters being positioned with respect to the associated devices to bring transparent sections of the different shutters consecutively in position adjacent the associated devices at times when the circuits of the devices may be completed, and means operative upon reflection of the signal back to the airplane and cooperating with said control means for lighting one of said devices to indicate the distance to earth below the airplane.

3. In a system for determining the distance of an airplane from ground, a plurality of gaseous space discharge devices, a scale positioned adjacent each of said devices, a plurality of movable shutters, each having a transparent section and an opaque section, said shutters being respectively positioned adjacent said devices, control means for transmitting a signal from the airplane to ground, for effecting movement of said shutters at different speeds to bring the transparent sections of the different shutters consecutively in position adjacent the associated devices and for partially completing circuits through the devices when the transparent section of a shutter is opposite a device, and means effective upon reflection of said signal back to the airplane and cooperating with said control means for igniting one of said devices to indicate the distance of the airplane from ground according to the device which is ignited and according to the exposed portion of the ignited device with respect to the scale associated therewith.

4. In an altimeter for an airplane, a plurality of gaseous space discharge devices, a movable shutter located adjacent each of said devices, each shutter having an opaque section and a transparent section, means for operating said shutters at different speeds to bring transparent sections of the shutters consecutively in position adjacent the associated devices, control means for transmitting a signal from the airplane to earth and for partially completing circuits through said devices at times when the transparent sections of the shutters are in position adjacent the devices, and means operative upon reflection of the signal back to the airplane and cooperating with said control means for lighting one of said devices to indicate the distance to earth below the airplane according to the device which is ignited.

5. In an altimeter for an airplane, a plurality of gaseous space discharge devices for indicating different ranges of distances when ignited, means for transmitting a longitudinal wave signal at predetermined intervals from the airplane and for consecutively preparing circuits for igniting said devices, means responsive to the reflected signal for completing one of the circuits through one of the devices according to the distance traveled by the signal to indicate the range of distances traveled by the signal, and means associated with each of said devices for indicating the distance within the range through which said longitudinal wave has traveled.

EDGAR W. GENT.